United States Patent
Viltro et al.

(10) Patent No.: US 7,127,874 B2
(45) Date of Patent: Oct. 31, 2006

(54) PROCESS FOR MAKING POUCHES

(75) Inventors: Louis John Viltro, Hamilton, OH (US); Rachid Ben Moussa, La Hulpe (BE); Timothy Bernard William Kroese, Brussels (BE); Tanguy Marie Louise Alexandre Catlin, Boston, MA (US); Gregory Martin Gressel, Cincinnati, OH (US); Carl Noble, Maineville, OH (US); Ray Kaercher, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 500 days.

(21) Appl. No.: 10/631,158

(22) Filed: Jul. 31, 2003
(Under 37 CFR 1.47)

(65) Prior Publication Data
US 2004/0144064 A1    Jul. 29, 2004

Related U.S. Application Data

(63) Continuation of application No. PCT/US02/02966, filed on Jan. 31, 2002.

(60) Provisional application No. 60/265,462, filed on Jan. 31, 2001.

(51) Int. Cl.
*B65B 47/00* (2006.01)
(52) U.S. Cl. ................................. 53/453; 53/478
(58) Field of Classification Search ............... 53/453, 53/456, 478, 559, 561, 373.5, 373.7, 276, 53/277, 278
See application file for complete search history.

(56) References Cited

U.S. PATENT DOCUMENTS

| | | | | |
|---|---|---|---|---|
| 2,340,678 A | * | 2/1944 | Milmoe et al. ............... 53/277 |
| 2,879,635 A | * | 3/1959 | Brock .......................... 53/453 |
| 3,750,362 A | * | 8/1973 | Kishpaugh et al. ........... 53/453 |
| 3,766,702 A | * | 10/1973 | Meisser et al. ............... 53/453 |
| 3,808,772 A | | 5/1974 | Turtschan |
| 4,017,247 A | | 4/1977 | Soukup et al. |
| 4,704,844 A | * | 11/1987 | Mancini ....................... 53/453 |
| 4,973,416 A | * | 11/1990 | Kennedy ..................... 510/296 |
| 5,649,412 A | * | 7/1997 | Binacchi ....................... 53/453 |
| 6,624,130 B1 | * | 9/2003 | Giblin et al. ................ 510/297 |
| 2001/0053754 A1 | | 12/2001 | Hewitt et al. |

FOREIGN PATENT DOCUMENTS

| | | |
|---|---|---|
| EP | 0 188 832 A | 7/1986 |
| WO | WO 92/17382 A | 10/1992 |
| WO | WO 93/08095 A | 4/1993 |

\* cited by examiner

*Primary Examiner*—Louis Huynh
(74) *Attorney, Agent, or Firm*—Armina E. Matthews; Ian S. Robinson; Kim W. Zerby

(57) ABSTRACT

The present invention relates to a continuous, horizontal process for making water-reactive pouches, involving the steps of:
  a) continuously feeding a first water-soluble film onto a horizontal portion of an continuously and rotatably moving endless surface, which comprises a plurality of moulds, or onto a non-horizontal portion thereof and continuously moving the film to said horizontal portion;
  b) forming from the film on the horizontal portion of the continuously moving surface, and in the moulds on the surface, a continuously moving, horizontally positioned web of open pouches;
  c) filling the continuously moving, horizontally positioned web of open pouches with a product, to obtain a horizontally positioned web of open, filled pouches;
  d) closing the web of open pouches, to obtain closed pouches, preferably by feeding a closing material onto the horizontally positioned web of open, filed pouches, to obtain closed pouches; and
  preferably sealing the closed pouches and whereby step d) and preferably step e) is also done in a continuous manner, preferably while the web of pouches is in horizontal position and continuously moving.

The products introduced in the pouch are preferably cleaning compositions or fabric care compositions, in particular laundry or dish washing compositions.

15 Claims, No Drawings

PROCESS FOR MAKING POUCHES

CROSS-REFERENCE

This is a continuation of International Application PCT/US/02/02966, with an international filing date of Jan. 31, 2002, which claims benefit of Provisional Application Ser. No. 60/265,462, filed Jan. 31, 2001.

TECHNICAL FIELD

The present invention relates to a continuous process for making water-reactive (water-soluble) and water-permeable pouches, involving the use of a continuously moving, horizontally positioned endless surface with moulds, whereby the pouches are formed, filled and preferably closed in horizontal position and in a continuous manner.

BACKGROUND TO THE INVENTION

Cleaning compositions nowadays come in a number of product forms, such as granules, liquids and unit dose forms, including water-soluble or water-permeable pouches.

The most common process for making water-soluble pouches with products such as cleaning products is the so-called vertical filling process. Hereby, a vertically hanging string of open pouches is formed by folding a film, which is then transported in under a filling machine which partially fills the pouches, allowing a head space whereby the top part of the open pouch is then subsequently sealed together to close the pouch. The typically pillow shapes pouches are then cut loose of the string to form individual pouches.

A second known process for making pouches is by use of a die having series of moulds and forming from a film, open pouches in these moulds, which can then be filled and sealed. This method uses the pouch film material more efficiently and the process has a more flexibility in types of pouch shapes and ingredients used, however, the process is not very suitable in industrial, because it can not produce large quantities of pouches (per time unit), in an easy and efficient manner.

A third process proposed is the formation of pouches in moulds present on the surface of a circular drum. Hereby, a film is circulated over the drum and pockets are formed, which pass under a filling machine to fill the open pockets. The filling and sealing needs to take place at the highest point (top) of the circle described by the drum, e.g. typically, filling is done just before the rotating drum starts the downwards circular motion, and sealing just after the drum starts its downwards motion.

The problem associated with the vertical filling machine is that the process is not very efficient: the process is intermittent and very slow, for example due to process speed changes from one step to the next step, and each pouch formation step result typically only in one string of pouches in one dimension; thus, only a limited amount of pouches per minute can be formed. Moreover, the large quantities of film are used per product dose, because the method does not allow complete filling of the pouches and the method does not allow stretching of the film. Also, there is not much flexibility in shapes of pouches formed.

The problems associated with the second process using a die with moulds include also that that process is intermittent (or an index process), and that the process is slow and involves acceleration and deceleration, which reduces the overall speed and moreover, causes product spillage out of the open pouches. Also, the output of this process is not very high (per time unit).

The circular drum process overcomes some of the disadvantages of the first vertical filing process (and even the second (moulding) process to a certain extend), because it does not need speed changes (no acceleration/deceleration) and it can more easily provide pouches in two dimensions and the shape of the pouches can be changes to some extend. However, the spillage from the pouches is quite substantial, due to the circular movement, which causes product to spill onto the sealing area, and this causes problems with the sealing (leaking seals). Also, the process does not allow the pouches to be filled completely, because the spillage is then even more of a problem. Also, this process has even more significant problems when used for liquid products, which are more likely to cause large spillage, due to the circular motion. Moreover, the filling and sealing has to be done around the highest point of the circle movement of the drum, and thus hugely reducing the overall speed and the output of the pouch formation process.

Thus, alternative ways and more efficient ways to produce unit dose products are desirable.

The inventors have now found an improved process for making water-reactive or water-soluble pouches in industry. They found a way to overcome the problems of an intermittent process. Also, they found a way to overcome the problems of processes using a drum or the vertical filling technique.

The invention provided is a horizontal, continuous process whereby a horizontally positioned portion of an endless surface with moulds (in two dimensions), which moves continuously in one direction, is used to form the pouches, namely whereby a film is continuously fed onto this surface, and then, the film is drawn into the moulds on the horizontal portion of the surface, to continuously form a web of open pouches positioned in horizontal position, which can then be filled with the product (such as cleaning products, including liquid product), whilst horizontal and whilst moving continuously, and which is then preferably also closed whilst still horizontal and moving continuously. Hereby, the pouches can be filled about completely, because no speed changes occur and thus much less or no spillage. Also, the process allows great flexibility in film size used, pouch sizes, pouches shapes, product forms, time required per step (by varying length of horizontal surface, or changing the constant speed, for example) without impacting much on the overall output of the pouch making process. Also, the process uses a minimum of film material per pouch, in particular if during the pouch formation step or closing step, the film is stretched.

SUMMARY OF THE INVENTION

The present invention relates to a continuous process for making water-reactive pouches, containing a product, the process comprising the steps of:

a) continuously feeding a first water-soluble film onto a horizontal portion of an continuously and rotatably moving endless surface, which comprises a plurality of moulds, or onto a non-horizontal portion thereof and continuously moving the film to said horizontal portion;

b) forming from the film on the horizontal portion of the continuously moving surface, and in the moulds on the surface, a continuously moving, horizontally positioned web of open pouches;

c) filling the continuously moving, horizontally positioned web of open pouches with a product, to obtain a horizontally positioned web of open, filled pouches;

d) preferably continuously, closing the web of open pouches, to obtain closed pouches, preferably by feeding a closing material onto the horizontally positioned web of open, filed pouches, to obtain closed pouches; and e) optionally sealing the closed pouches.

Preferably, the continuous process is such that all of steps a) to c) and preferably d) are done on the horizontal portion of the endless surface, and such that said surface and web of pouches (if applicable to that step) moves horizontally with a constant speed. Even step e) may be done on this horizontal portion of the endless surface.

The film is preferably drawn into the mould by application of a vacuum to, in or on the moulds, typically through the bottom of the moulds onto the film.

The product can be solid or liquid; the product is preferably a fabric cleaning or surface cleaning product and/or fabric or surface care product.

The invention also relates to a continuous process for making pouches, containing a containing a fabric or surface cleaning product and/or fabric or surface care product, preferably water-permeable pouches, which is as the process above, with the exception that in step a) a first non-water-soluble film, preferably water-permeable film, is fed continuously onto a horizontal portion of an continuously and rotatably moving endless surface, which comprises a plurality of moulds.

Typically, the process provides much more pouches per minute than known processes; depending on the speed of the motion of the surface, which depends for example of the amount of product to be dosed per pouch, ease of pouch formation of the film, this process typically produces between 500 to 8000 or even 1000 to 6000 or even 2000 to 5000 pouches per minute.

DETAILED DESCRIPTION OF THE INVENTION

The process involves continuously feeding a water-soluble film (or water-permeable film, in another embodiment of the invention) onto an endless surface, preferably onto a horizontal portion of an endless surface, or otherwise, on a non-horizontal portion of this surface, such that it moves continuously towards the horizontal portion and thus eventually onto the horizontal portion. Preferred is however that it is fed directly onto the horizontal portion.

Typically, the horizontal portion of the surface will move continuously in horizontal position, until it rotates around an axis perpendicular to the direction of motion, typically about 180 degrees, to then move in opposite direction, which may also be a horizontal motion; eventually, the surface will rotate again to reach the initial horizontal position and movement (when or where after step a) starts again).

Mean used herein, 'endless surface' means that the surface is endless in one dimension at least, preferably only in one dimension. For example, the surface is preferably part of a rotating platen conveyer belt comprising moulds, as described below in more detail.

The horizontal part of the surface can have any width, typically depending on the amount of rows of moulds along the dimension of the width and the size of the moulds and the size of the space between moulds required. The horizontal part of the endless surface can have any length, typically depending on the amount of process steps required to take place on this portion of the surface (during the continuous horizontal motion of the surface), on the time required per step and on the optimum speed of the surface needed for these steps. Of course, by using a lower or higher continuous speed throughout the process, the length of the surface may be only shorter or longer. For example, if all of step f a) to e) are performed on the horizontal portion, the portion needs to be longer or the speed slower than if for example only step a) to c) are done on the horizontal portion. Preferred may be that the width of the surface is up to 1.5 meters, or even up to 1.0 meters or preferably between 30 and 60 cm.

Preferred may be that the horizontal portion of the endless surface is from 2 to 20 meters, or even 4 to 12 meters or even from 6 to 10 or even 9 meters.

The surface is typically moved with a constant speed throughout the process, which can be any constant speed. Preferred may be speeds of between 1 and 80 meters/minute, or even 10 to 60 m/min. or even from 2- to 50 m/min. or even 30 to 40 m/min.

Preferably, step a), b), c) and d) and preferably also e) are all done on a horizontal portion of the surface, while the surface is in continuous motion. However, it is possible that steps d) and/or e) is/are done as intermittent process step(s), for example by removing the web of pouches from the surface and closing and/or sealing the pouches elsewhere. Preferably though, step d) and e) are also done in horizontal position, i.e. in the position as obtained during manufacturing steps a), b) and c), and preferably on the same horizontal portion of the surface, used in step a), b) and c).

Thus, the process is preferably done on an endless surface which has a horizontal motion for such a time to allow formation of the web of pouches, filling of the pouches and preferably closing and preferably even sealing and preferably even cutting to separate the pouches from each other (as described below, with the option that two or more are still attached to another or to get the web into individual pouches). Then, preferably after the closing and preferably sealing step or even cutting step, the endless web of pouches or pouches is/are removed from the surface and the surface will rotate around an axis perpendicular to the direction of motion, typically about 180 degrees, to then move in opposite direction, typically also horizontally, to then rotate again, where after step a) starts again.

Preferably, the surface is part of and/or preferably removably connected to a moving, rotating belt, for example a conveyer belt or platen conveyer belt. Then preferably, the surface can be removed and replaced with another surface having other dimensions or comprising moulds of a different shape or dimension. This allows the equipment to be cleaned easily and more over to be used for the production of different types of pouches. This may for example be a belt having a series of platens, whereof the number and size will depend on the length of the horizontal portion and diameter of turning cycles of the surface, for example having 50 to 150 or even 60 to 120 or even 70 to 100 platens, for example each having a length (direction of motion of platen and surface) of 5 to 150 cm, preferably 10 to 100 cm or even 20 to 45 cm.

The platens then form together the endless surface or part thereof and typically the moulds are comprised on the surface of the platens, for example each platen may have a number of moulds, for example up to 20 moulds in the direction of the width, or even from 2 to 10 or even 3 to 8, and for example up to 15 or even 1 to 10 or even 2 to 6 or even 2 to 5 moulds lengthwise, i.e. I the direction of motion of the patens.

The surface, or typically the belt connected to the surface, can be continuously moved by use of any known method. Preferred is the use of a zero-elongation chain system, which drives the surface or the belt connected to the surface.

If a platen conveyer belt is used, this preferably contains a) a main belt (preferably of steel) and b) series of platens, which comprise 1) a surface with moulds, such that the platens form the endless surface with moulds described above, and 2) a vacuum chute connection and 3) preferably a base plate between the platens and the vacuum chute connection. Then, the platens are preferably mounted onto the main belt such that there is no air leakage from junctions between platens. The platen conveyer belt as a whole moves then preferably along (over; under) a static vacuum system (vacuum chamber).

It should be understood that thus all platens and the main belt move continuously, typically with the same constant speed.

The surface, or platens described above, are preferably made from corrosion resistant material, which is durable and easy to clean. Preferred may be that the surface or platens, including the mould areas are made of aluminum, preferably mixed with nickel, or optionally only the outside layers comprising nickel and/or nickel aluminum mixtures.

Preferably, at least the top layer between and/or in the moulds of the surface is of deformable resilient material, preferably at least the top layer between the moulds. The material is typically such that it has a friction coefficient of 0.1 or more, preferably 0.3 or more. For example, the top layer between the moulds, but even in the moulds, can be of rubber, silicon material or cork, preferably rubber or silicon rubber. Preferred is also that the material is not too hard, for example similar to silicon rubber having a shore value of 10 to 90.

The moulds can have any shape, length, width and depth, depending on the required dimensions of the pouches. Per surface, the moulds can also vary of size and shape from one to the other, if desirable. For example, it may be preferred that the volume of the final pouches is between 5 and 300 ml, or even 10 and 150 ml or even 20 and 100 ml or even up to 80 ml and that the mould sizes are adjusted accordingly.

The feeding of the film to, and typically onto or on top of the surface and preferably onto the horizontal portion thereof, is done continuously, and thus typically with a constant speed throughout the process. This can be done by any known method, preferably by use of rollers from which the film unwinds. The film can be transported from the rollers to the surface by any means, for example guided by a belt, preferably a deformabale resilient belt, for example a belt of rubber or silicone material, including silicone rubber. The material is typically such that it has a friction coefficient of 0.1 or more, preferably 0.3 or more.

Preferred may be that the rollers rewind the film with a speed of at least 100 meters per minute, or even 120 to 700 m/min., or even 150 to 500 m/min., or even 250 to 400 m/min.

Once on the surface, the film can be held in position, e.g. fixed or fixated on the surface, by any means. For example, the film can be held with grips or clips on the edges of the surface, where there are no moulds, or pressed down with rollers on the edges of the surface, where there are no moulds, or held down by a belt on the edges of the surface, where there are no moulds.

The open pouches can be formed in the moulds by any method, and as described above, preferred methods include the use of (at least) a vacuum or under-pressure to draw the film into the moulds Other preferred methods include heating and/or wetting the film and thereby making the film more flexible or even stretched, so that it adopts the shape of the mould; preferably, combined with applying a vacuum onto the film, which pulls the film into the moulds, or combinations of all these methods.

Preferred is thus that each mould comprises one or more holes which are connected to a system which can provide a vacuum through these holes, onto the film above the holes, as described herein in more detail. Preferred is that the vacuum system is a vacuum chamber comprises at least two different units, each separated in different compartments, as described herein.

Heat can be applied by any means, for example directly, by passing the film under a heating element or through hot air, prior to feeding it onto the surface or once on the surface, or indirectly, for example by heating the surface or applying a hot item onto the film, for example to temperatures of 50 to 120° C., or even 60 to 90° C., preferably for example with infra red light.

The film can be wetted by any mean, for example directly by spraying a wetting agent (including water, solutions of the film material or plasticisers for the film material) onto the film, prior to feeding it onto the surface or once on the surface, or indirectly by wetting the surface or by applying a wet item onto the film.

The filling of the web of open pouches while it moves horizontally with continuous motion, can be done by any known method for filling (moving) items. The exact most preferred method depends on the product form and speed of filling required.

One method is for example flood dosing, whereby the web of open pouches passes with continuous horizontal motion under a dosing unit which is static and which has a device to accurately dose a set amount or volume of product per time unit. The problem or disadvantage of this method may be that product will be dispensed on the areas between the open pouches, which typically serves as sealing area; this not only may be a waste of product, but also makes sealing more difficult.

Generally, preferred methods include continuous motion in line filling, which uses a dispensing unit positioned above the open pouches which has a endless, rotating surface with nozzles, which typically moves rotatably with continuous motion, whereby the nozzles move with the same speed as the pouches and in the same direction, such that each open pouch is under the same nozzle or nozzles for the duration of the dispensing step. After the filling step, the nozzles rotate and return to the original position, to start another dispensing/filling step.

Every nozzle or a number of nozzles together, is preferably connected to a device which can accurately control that only a set amount or volume of product is dispensed during one rotation per nozzle, e.g. thus in one pouch.

Preferred may be that the filling/dispensing system is such that from 10 to 100 cycles (filling steps) can be done per minute, or even 30 to 80 or even 40 to 70 per minute. This will of course be adjusted depending o the size of the open pouches, speed of the surface etc.

A highly preferred method for filling the open pouches is a reciprocating-motion-filling method. This process preferably uses a moving filling station which is returnable (changes direction of motion) and variable in speed. The filling station has typically a series of nozzles which each move with the same speed as the open pouches (to be filled) and in the same direction for the period that product needs to dispensed into the open pouches. Then, typically when a pouch is full, the nozzle or nozzles which filled the pouch stop their movement along with the pouch and return in opposite direction, to then stop again, such that it is positioned above another open pouch(es) which is (are) still to be filled, and to then start moving again in opposite direction, with the same speed and direction as the open pouches, until it reaches the speed of the pouches, to then continue with this speed and start dispensing and filling of the pouch(es), as in the previous filling cycle. The speed of the returning movement may be higher than the speed of the movement during filling.

Every nozzle or a number of nozzles together is preferably connected to a device which can accurately control that only a set amount or volume of product is dispensed during one rotation per nozzle, e.g. thus in one pouch.

The filling unit or station used in the process of the invention preferably uses a flow meter and/or positive replacement pump to dose the correct amounts or volumes of product per open pouch, in particular a positive replacement pump has been found to very accurate. Hereby, the required amount or volume of product is introduced in the pump and this is then fed to the nozzles. For example, if the system is such that 60 pouches are to be filled per filling cycle, typically 60 nozzles are provided, connected to 60 positive replacement pumps (one pump per nozzle, per pouch), which are all connected to a general tank with product.

The pumps can be adjusted depending on the product to be dispensed. For example, if the product is a viscous liquid, the pumps need to be stronger, if a fast filling, and thus movement of the surface is required.

Other methods which can be used include flow measurement, by use of a magnetic flow meter or mass flow meter, and pressure flow filling/measurement (which keeps the pressure constant and controlling filling time and thereby volume).

It can also be preferred to use a filling system whereby, prior to filling, a second surface with openings, which each have a surface area equaling the surface area of an open pouch, is placed above the continuously moving web of open pouches and is moved continuously in the direction of the web of pouches and with the speed of the web of open pouches, such that each opening remains positioned above one open pouch during the filling step and that the space between at least part of the moulds is covered by said surface, preferably said second surface being an endless, rotatably moving belt.

The filling will then take place through the openings in this surface or belt, such that the product can only enter in the open pouches and not on the area between the pouches, which is covered. This is advantages because the area between the open pouches (between the moulds), which typically serves as sealing area when closing the pouches, remains free of product, which ensures a better or easier seal.

The filled, open pouches are then closed, which can be done by any method. Preferably, this is also done while in horizontal position and in continuous, constant motion, and preferably on the horizontal portion of the endless surface described above. Preferred is that the closing is done by continuously feeding a second material or film, preferably water-soluble film, over and onto the web of open pouches and then preferably sealing the first film and second film together, typically in the area between the moulds and thus between the pouches. Preferred is that the closing material is fed onto the open pouches with the same speed and in moving in the same direction as the open pouches Alternatively, the closing material may be a second web of closed, filled pouches, which is then also preferably done as described above, e.g. by placing the web of closed filled pouches on the open pouches in a continuous manner, preferably with constant speed and moving in the same direction of the open pouches, and which is preferably subsequently sealed to the first film.

The sealing can be done by any method. The sealing may be done in a discontinuous manner, for example by transporting the web of pouches to another sealing area and sealing equipment. However, the sealing is preferably done continuously and preferably with constant speed whilst the closed web of pouches moves continuously and with constant speed, and it may also preferably done in horizontal position, preferably also on said horizontal portion of the surface.

Preferred methods include heat sealing, solvent welding, and solvent or wet sealing. Hereby it may be preferred that only the area which is to form the seal, is treated with heat or solvent. The heat or solvent can be applied by any method, preferably on the closing material, preferably only on the areas which are to form the seal. Preferred may be that when heat sealing is used, a roller with cavities of the size of the part of the pouch, which is not enclosed by the mould, and having a pattern of the pouches, is (continuously) rolled over the web pouches, passing under the roller. Hereby, the heated roller contact only the area which is to be the sealing areas, namely between the pouches, around the edges of the moulds. Typically sealing temperatures are from 50 to 300C, or even or even from 80 to up to 200C, depending on the film material of course. Also useful is a movable, returnable sealing device, operating as the returnable, movable filling/dosing device above, which contacts the area between the moulds, around the edges, for a certain time, to form the seal, and then moves away from the sealing area, to return backwards, to start another sealing cycle.

If solvent or wet sealing or welding is used, it may be preferred that also heat is applied. Preferred wet or solvent sealing/welding methods include applying selectively solvent onto the area between the moulds, or on the closing material, by for example, spraying or printing this onto these areas, and then applying pressure onto these areas, to form the seal. Sealing rolls and belts as described above (optionally also providing heat) can be used, for example.

The closed and preferably sealed web of pouches can then be cut by a cutting device, which cuts the pouches from one another, in separate pouches or such that two or more pouches are still attached to another, which ever may be required. The cutting can be done by any known method. It may be preferred that the cutting is also done in continuous manner, and preferably with constant speed and preferably while in horizontal position. However, the cutting step does not need to be done in horizontal position, nor continuously. For example the web of closed (sealed) pouches can be transported to the cutting device, .g. to another surface, where the cutting device operates. Although, for ease of processing it may be preferred to perform the cutting step on the same surface as steps a) to c) and preferably d) an e) described above (in-line cutting).

The cutting device can for example be a sharp item or a hot item, whereby in the latter case, the that 'burns' through the film/sealing area. Preferred may be a roller with sharp tools, such as a knife, with cavities of the size and pattern of the pouches, which rolls over the pouches such that the sharp tools only touch the area to be cut. Preferred may also be when the web of pouches is moving in one direction (e.g. continuously and/or horizontally, for example still on the endless surface herein) a static device contacting the area between the pouches along the direction of movement can be sued, to cut the pouches in the direction of movement in a continuous manner. Then, the cutting between the pouches along the direction of the width of the web of pouches can be done by an intermittent cutting step, for example by applying a cutting device for a brief period onto the area, removing the cutting device and repeating this action with the next set of pouches.

The pouch, when used herein can be of any form, shape and material which is suitable to hold the product prior to use, e.g. without allowing the release of the composition from the pouch prior to contact of the pouched composition to water. The exact execution will depend on for example the type and amount of the composition in the pouch, the characteristics required from the pouch to hold, protect and deliver or release the compositions, the number of compartments in the pouch (e.g. if the web of open pouches is closed by an other web of already closed pouches, the final pouch has two compartments).

The pouch may be of such a size that it conveniently contains either a unit dose amount of the product herein, suitable for the required operation. For example, when the product is a cleaning composition, the amount in the pouch can be such that it is suitable for one wash, or only a partial dose, to allow the consumer greater flexibility to vary the amount used, for example when the pouched product is a detergent composition, it may depend on the size and/or degree of soiling of the wash load.

In one execution, the pouch is water-reactive, which mean for the purpose of the invention that the pouch itself dissolves, disintegrates or dispersed upon contact with water. Preferably, the pouch as a whole is water-soluble.

In another execution, when the product is a fabric or surface cleaning and/or care product, the pouch may also be water-permeable, allowing dissolution of the product inside the pouch through the pouch, upon contact with water.

Preferably, the first film and preferably also the closing material is made of water-dispersable, water-disintegrating or more preferably water-soluble material, preferably a film material which is stretchable, so it can easily adopt the shape of the moulds, used in the process herein.

In particular when the process herein is such that the open pouches are filled 95% by volume or even 100% or even over filled, it is beneficial if the film and preferably also the closing material is stretchable, so that closing is easier. Moreover, the material is preferably elastic, to ensure that after stretching, the film shrinks again, to provide a tight packing and to ensure no (additional) head space can be form after closure of the pouch.

Preferred stretchable materials have a maximum stretching degree of at least 150%, preferably at least 200%, more preferably of at least 400% as determined by comparison of the original length of a piece of material with the length of this piece of material just prior to rupture due to stretching, when a force of at least 1 Newton is applied. Preferably, the material is such that it has a stretching degree as before, when a force of at least 2 Newton, or even at least 3 Newton is used. Preferably, it has this stretching degree when a force of the above lower limits is used, but not more than 20 Newton, or even 12 Newton, or even 8 Newton.

For example, a piece of film with a length of 10 cm and a width of 1 cm and a thickness of 40 microns is stretched lengthwise with a force of for example 2.8 Newton and thus an increasing stress, up to the point that it ruptures. The extent of elongation just before rupture can be determined by continuously measuring the length and the degree of stretching can then be calculated. For example, this piece of film with an original length of 10 cm can be stretched with a force of 2.8 Newton to 52 cm (just before rupture) and thus has a maximum stretching degree of 520% (at a force of at least 2 Newton, namely 2.8 Newton).

The force to stretch such a piece of film (10 cm×1 cm×40 microns) to a degree of 200% should preferably be at least 1 Newton, preferably at least 2 Newton, more preferably at least 2.5 or even 3 Newton, and preferably no more than 20 Newton, preferably less than 12 Newton, most preferably less than 8 Newton. This in particular ensures that the elastic force remaining in the film after forming is high enough to immobilize the product within the pouch, but still not too high to easily mould and form a pouch from it.

As is clear form the definition herein, the stretchable material is defined by a degree of stretching measured when it is not present in the form of a closed pouch.

The elasticity of the film is herein typically defined as the 'elasticity recovery'. This can be determined by stretching the film (for example to an elongation of 200%, as set out above) and measuring the length of the material after release of the stretching force. For example a piece of film of a length of 10 cm and width 1 cm and thickness of 40 microns is stretched lengthwise to 20 cm (200% elongation) with a force of 2.8 Newtons (as above), and then the force is removed. The film snaps back to a length of 12 cm, which means 80% elastic recovery.

Preferably, at least the fist film material has an elasticity such that the elastic recovery is from 20% to 100%, more preferably from 50% or from 60% or more preferably from 75% or even 80% to 100%.

It may be preferred that the degree of stretching is non-uniform over the pouch, due to the formation and closing process. For example, when the film is positioned over the surface with moulds and a web of open pouches is formed by vacuum forming, the part of the film in the bottom of the mould, furthest removed form the points of closing, will be stretched more than in the top part. The film has typically a thickness variation from 10% to 1000%, preferably 20% to 600%, or even 40% to 500% or even 60% to 400%. This can be measured by any method, for example by use of an appropriate micrometer. This can be measured with a pair of calipers such as available form Mitutoyo Uk Ltd, under no. CD-6"CP.

Preferred water-dispersable film material herein has a dispersability of at least 50%, preferably at least 75% or even at least 95%, as measured by the method set out hereinafter using a glass-filter with a maximum pore size of 50 microns. More preferably the film material is water-soluble and has a solubility of at least 50%, preferably at least 75% or even at least 95%, as measured by the method set out hereinafter using a glass-filter with a maximum pore size of 20 microns, namely:

Gravimetric method for determining water-solubility or water-dispersability of the material of the compartment and/or pouch: 5 grams±0.1 gram of film material is added in a 400 ml beaker, whereof the weight has been determined, and 245 ml±1 ml of distilled water is added. This is stirred vigorously on magnetic stirrer set at 600 rpm, for 30 minutes. Then, the mixture is filtered through a folded qualitative sintered-glass filter with the pore sizes as defined above (max. 20 or 50 micron). The water is dried off from the collected filtrate by any conventional method, and the weight of the remaining polymer is determined (which is the dissolved or dispersed fraction). Then, the % solubility or dispersability can be calculated.

Preferred film are made of polymeric materials. The film can for example be obtained by casting, blow-molding, extrusion or blow extrusion of the polymer material, as known in the art.

Preferred polymer copolymers or derivatives thereof are selected from polyvinyl alcohols, polyvinyl pyrrolidone, polyalkylene oxides, (modified) cellulose, (modified)cellulose-ethers or -esters or -amides, polycarboxylic acids and salts including polyacrylates, copolymers of maleic/acrylic acids, polyaminoacids or peptides, polyamides including polyacrylamide, polysaccharides including starch and gelatine, natural gums such as xanthum and carragum. Preferably, the polymer is selected from polyacrylates and acrylate copolymers, including polymethacrylates, methylcellulose, sodium carboxymethylcellulose, dextrin, maltodextrin, ethylcellulose, hydroxyethyl cellulose, hydroxypropyl methylcellulose,; most preferably polyvinyl alcohols, polyvinyl alcohol copolymers and/or hydroxypropyl methyl cellulose(HPMC).

The polymer may have any weight average molecular weight, preferably from about 1000 to 1,000,000, or even form 10,000 to 300,000 or even form 15,000 to 200,000 or even form 20,000 to 150,000.

Mixtures of polymers can also be used. This may in particular be beneficial to control the mechanical and/or dissolution properties of the pouch, depending on the application thereof and the required needs. For example, it may be preferred that a mixture of polymers is present in the material of the film, whereby one polymer material has a higher water-solubility than another polymer material, and/or one polymer material has a higher mechanical strength than another polymer material. It may be preferred that a mixture of polymers is used, having different weight average molecular weights, for example a mixture of PVA (or a copolymer thereof) and/or HPMC of a weight average molecular weight of 10,000–40,000, preferably around 20,000, and of PVA (or copolymer thereof) and/or HPMC with a weight average molecular weight of about 100,000 to 300,000, preferably around 150,000.

Also useful are polymer blend compositions, for example comprising hydrolytically degradable and water-soluble polymer blend such as polylactide and polyvinyl alcohol, achieved by the mixing of polylactide and polyvinyl alcohol, typically comprising 1–35% by weight polylactide and approximately 65–99 by weight polyvinyl alcohol, if the material is to be water-dispersable, or water-soluble.

It may be preferred that the polymer present in the film material of the compartment is from 60–98% hydrolised, preferably 80% to 90%, to improve the dissolution of the material.

Most preferred are materials which are water-soluble stretchable and elastic material comprising PVA polymer having properties such as for example, available from Nordenia, Aquafilm, Kuraray, Chris-Craft Industrial Products.

Preferably, the level of a type polymer (e.g. commercial mixture) in the film material, for example PVA polymer, is at least 60% by weight of the material or film, preferably at least 60% or even at least 70% or even at least 80 or 90%. The upper level is up to 100%, but typically 99% or even 98% by weight.

The film material herein may comprise other additive ingredients then the polymer or polymer material. For example, it may be beneficial to add plasticisers, for example glycerol, ethylene glycol, diethyleneglycol, propylene glycol, sorbitol and mixtures thereof, additional water, disintegrating aids. It may be useful when the pouched product is a detergent composition or fabric care composition, that the film material itself comprises a detergent or fabric care additive to be delivered to the wash water, for example organic polymeric soil release agents, dispersants, dye transfer inhibitors.

The film may be coated, preferably only one-sided, with any coating method and with any coating agent, depending on the required properties; for example, it may be beneficial to coat the film such that the pouch is more storage stable and/or less sensitive to moisture and/or acts as a improved moisture barrier.

A very useful form is to coat the material or film on one side with a coating that slows the dissolution of the film, prior to forming of the compartment and thus prior to stretching the film. Then, by stretching the film, the coating is stretched as well, resulting in cracks in the coating and/or uneven distribution of the coating over the material and thus over the compartment. This then still ensures stability against moisture during storage, whilst the presence of cracks or the uneven distribution still ensures the required dissolution in use. Hence it is possible to make a pouched product that is resistant to being handled with wet fingers when it is picked up at the sides but will still release product rapidly when it is immersed in water due to film rupture at the thinnest points.

Any coating material can be used, particular useful are hydrophobic coatings, or polymers with a low water-solubility, lower then defined herein before.

The product contained in the pouch is preferably a liquid or solid cleaning composition or care composition, preferably a laundry or dish washing composition, hard-surface cleaner and/or a fabric or surface care composition, such as conditioners, rinse additives, pretreatment and/or soaking compositions.

Fabric care compositions or laundry rinse additives preferably comprise at least one or more softening agents, such as quaternary ammonium compounds and/or softening clays, and preferably additional agent such as anti-wrinkling aids, perfumes, chelants, fabric integrity polymers.

Although the nature of the pouched products is such that it readily dissolves or disperses into the water, it may be preferred that disintegrating agents such as effervescence sources, water-swellable polymers or clays are present in the pouch itself, and/or in the product therein, in particular effervescence sources based on an acid and a carbonate source. Suitable acids include the organic carboxylic acids such as fumaric acid, maleic acid, malic acid, citric acid; suitable carbonate sources include sodium salts of carbonate, bicarbonate, percarbonate. Preferred levels for the disintegrating aids or effervescence sources or both are from 0.05% to 15% or even from 0.2% to 10% or even form 0.3 to 5% by weight pouched composition.

What is claimed is:

1. Continuous process for making water-reactive pouches containing a product, comprising the steps of:
    a) continuously feeding a first water-soluble film onto a horizontal portion of a continuously and rotatably moving endless surface, which comprises a plurality of moulds, or onto a non-horizontal portion thereof and continuously moving the film to said horizontal portion:
    b) forming from the film on the horizontal portion of the continuously moving surface, and in the moulds on the surface, a continuously moving, horizontally positioned web of open pouches;
    c) filling the continuously moving, horizontally positioned web of open pouches with a product, to obtain a horizontally positioned web of open, filled pouches;
    d) continuously closing the web of open, filled pouches, to obtain closed pouches by feeding a closing material onto the horizontally positioned web of open, filled pouches, to obtain closed pouches;

e) sealing the closed pouches; and whereby steps a), b), c), d) and e) are done on said horizontal portion of the endless surface, which moves with a constant speed.

2. Continuous process as in claim 1 whereby step d) and step e) are done in a continuous manner, while the web of pouches is in horizontal position and continuously moving whereby in step d) and in step e) the web of pouches is present on said horizontal portion of the endless surface.

3. Continuous process according to claim 1 whereby the surface is part of a rotating platen conveyer belt.

4. Continuous process according to claim 1 whereby the film is drawn into the moulds by application on the film and/or moulds of vacuum, heat or a solvent, or combination thereof.

5. Continuous process according to claim 1 whereby the film is held in position on the surface by application of vacuum through holes present along the edges of the surface and/or present along the edges of the moulds of the surface.

6. Continuous process according to claim 1 whereby the filling of the open pouches with product is done by a moving filling station which is returnable and which is variable in speed.

7. Continuous process according to claim 1 whereby the closing step is done with a second film, or a second web of closed, filled pouches.

8. Continuous process according to claim 7 whereby the second film, comprises a water-soluble film.

9. Continuous process according to claim 7 whereby the second web of closed, filled pouches, comprises water-reactive pouches.

10. Continuous process according to claim 1 whereby the product is a solid or liquid fabric cleaning or surface cleaning product and/or fabric or surface care product.

11. Continuous process according to claim 10 whereby the product is a solid or liquid laundry detergent or dishwashing detergent.

12. Continuous process for making water-reactive pouches containing a product, comprising the steps of:
   a) continuously feeding a first water-soluble film onto a horizontal portion of a continuously and rotatably moving endless surface, which comprises a plurality of moulds, or onto a non-horizontal portion thereof and continuously moving the film to said horizontal portion;
   b) forming from the film on the horizontal portion of the continuously moving surface, and in the moulds on the surface, a continuously moving, horizontally positioned web of open pouches:
   c) filling the continuously moving, horizontally positioned web of open pouches with a product, to obtain a horizontally positioned web of open, filled pouches;
   d) continuously closing the web of open pouches to obtain closed pouches, by feeding a closing material onto the horizontally positioned web of open, filled pouches, to obtain closed pouches;
   e) sealing the closed pouches; and whereby, prior to filling, a second surface with openings, which each have a surface area equaling the surface area of an open pouch, is placed above the continuously moving web of open pouches and is moved continuously in the direction of the web of pouches and with speed of the web of open pouches, such that each opening remains positioned above one open pouch during the filling step and that the space between at least part of the moulds is covered by said second surface, said second surface being an endless, rotatably moving belt.

13. Continuous process according to claim 12 whereby the product is a solid or liquid fabric cleaning or surface cleaning product and/or fabric or surface care product.

14. Continuous process according to claim 13 whereby the product is a solid or liquid laundry detergent or dishwashing detergent.

15. Continuous process as in claim 12 whereby step d) and step e) are done in a continuous manner, while the web of pouches is in horizontal position and continuously moving whereby in step d) and in step e) the web of pouches is present on said horizontal portion of the endless surface.

* * * * *